(12) United States Patent
Brackett

(10) Patent No.: US 7,263,616 B1
(45) Date of Patent: Aug. 28, 2007

(54) ULTRASOUND IMAGING SYSTEM HAVING COMPUTER VIRUS PROTECTION

(75) Inventor: Charles Cameron Brackett, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 870 days.

(21) Appl. No.: 09/667,742

(22) Filed: Sep. 22, 2000

(51) Int. Cl.
G06F 12/14 (2006.01)
G06F 17/30 (2006.01)
A61B 1/00 (2006.01)
H04L 9/00 (2006.01)

(52) U.S. Cl. .................. 713/188; 600/101; 726/24; 726/30

(58) Field of Classification Search ............... 713/188, 713/200, 201; 600/437; 726/24, 28
See application file for complete search history.

(56) References Cited

U.S. PATENT DOCUMENTS

| | | | | |
|---|---|---|---|---|
| 4,442,486 A | * | 4/1984 | Mayer | 713/200 |
| 5,191,611 A | * | 3/1993 | Lang | 705/53 |
| 5,319,776 A | * | 6/1994 | Hile et al. | 713/200 |
| 5,684,875 A | * | 11/1997 | Ellenberger | 482/4 |
| 5,818,570 A | * | 10/1998 | Urbanczyk | 355/75 |
| 5,881,151 A | * | 3/1999 | Yamamoto | 713/200 |
| 5,944,821 A | | 8/1999 | Angelo | 713/200 |
| 5,956,481 A | * | 9/1999 | Walsh et al. | 713/200 |
| 6,065,118 A | * | 5/2000 | Bull et al. | 713/200 |
| 6,167,520 A | | 12/2000 | Touboul | 713/200 |
| 6,266,773 B1 | * | 7/2001 | Kisor et al. | 713/200 |
| 6,269,379 B1 | * | 7/2001 | Hiyama et al. | 707/104.1 |
| 6,275,937 B1 | * | 8/2001 | Hailpern et al. | 713/188 |
| 6,490,684 B1 | * | 12/2002 | Fenstemaker et al. | 713/182 |
| 6,557,102 B1 | * | 4/2003 | Wong et al. | 713/176 |
| 6,694,434 B1 | * | 2/2004 | McGee et al. | 713/189 |

FOREIGN PATENT DOCUMENTS

| | | |
|---|---|---|
| EP | 0570123 A1 | 11/1993 |
| WO | WO93/25024 | 12/1993 |
| WO | WO98/45778 | 10/1998 |
| WO | WO 00/36515 | 6/2000 |

* cited by examiner

*Primary Examiner*—Matthew Heneghan
(74) *Attorney, Agent, or Firm*—Ostrager Chong Flaherty & Broitman P.C.

(57) ABSTRACT

An ultrasound imaging system is provided with virus protection. Each file that enters the system (via the hard disk or the networking port) is scanned to detect the presence of any virus in the file. Before each file is written to the hard disk of the scanner, the Checksum and Size of the file are verified, along with other virus-identifying attributes, to determine if the file is infected with a virus or if the file itself is a virus. If there is a discrepancy in either the Checksum or Size, then a dialogue box appears, warning the system operator that the file being installed may contain a virus. In order to provide additional protection for the ultrasound scanner, all processes starting to run on the scanner are monitored. Each time a new process is started on the scanner, virus protection monitoring software will suspend the process and search for encrypted data identifying the starting process in a Registry table. If the starting process is listed in the table, then the starting process is un-suspended without the user ever knowing what happened. If the virus protection monitor does not find a match in the table, then a dialogue box appears on the screen, warning the system operator that the application may be a virus.

18 Claims, 5 Drawing Sheets

ULTRASOUND IMAGING SYSTEM HAVING COMPUTER VIRUS PROTECTION

FIELD OF THE INVENTION

This invention generally relates to ultrasound imaging systems. In particular, the invention relates to methods for providing protection against computer viruses.

BACKGROUND OF THE INVENTION

The use of computerized ultrasound imaging systems in the medical industry is widespread. Modern ultrasound imaging systems have the capability of communicating with other systems and other devices via networks, including local area networks, corporate intranets and the Internet. For example, ultrasound imaging systems are capable of transferring images to various types of remote devices, such as storage devices and printers, and receiving worklists from remote worklist brokers, via communications networks using the DICOM (Digital Imaging and Communications in Medicine) protocol. Images can also be sent from and message sent to an ultrasound imager over the Internet using the TCP/IP protocol. Images and/or operational data are also transferred from remotely situated ultrasound imaging systems to a central service facility via networks for the purpose of diagnosis. Conversely, service facilities have the capability of loading programs and data into remote ultrasound imaging systems via networks.

As ultrasound scanners become networked to transfer information to and from the machine, the risk of computer viruses being installed on the scanner greatly increases. There is a need for a method of protecting an ultrasound imaging system against computer viruses.

Furthermore, ultrasound imager manufacturers or service providers who provide the computer programming used by an ultrasound imaging system prohibit the installation of unauthorized software on the system. Obviously, in order to be in a position to guarantee the integrity of the system software, e.g., pursuant to an equipment warranty or service contract, that software must remain under the control of that manufacturer or service provider. Software integrity cannot be guaranteed if persons having access to the system are able to add software to the system or alter the software already resident in the system. Thus, there is also a need to provide protection against the installation on the imaging system of unauthorized software.

SUMMARY OF THE INVENTION

The present invention is directed to an ultrasound imaging system having software for protecting the system against viruses. As used herein, the term "virus" means any program or piece of code that is loaded into the imaging system without the manufacturer's or service provider's knowledge and permission. In accordance with one protection feature, files are screened for the presence of known viruses before they are installed on the hard disk of the imaging system. In accordance with another protection feature, any time an application is started, the application is checked to ensure that its presence on the system is authorized.

In accordance with the preferred embodiment of the invention, each file that enters the system (via the hard disk or the networking port) is scanned to detect the presence of any virus in the file. Before each file is written to the hard disk of the scanner, the Checksum and Size of the file are verified, along with other virus-identifying attributes, to determine if the file is infected with a virus or if the file itself is a virus. If there is a discrepancy in either the Checksum or Size, then a dialogue box appears, warning the system operator that the file being installed may contain a virus. The system operator is given the options of continuing or canceling. If the operator elects to continue, the suspicious file is written to the scanner's hard disk and an entry is placed in a virus log. If the operator elects to cancel, then the suspicious file is not written to the scanner's hard disk and no entry is made in the virus log.

In order to provide additional protection for the ultrasound scanner, any process starting to run on the scanner is monitored. The monitoring operation will be performed whenever the scanner has received an instruction requiring it to execute an application program not yet copied from the hard disk to system memory. Each time a new process is started on the scanner, a virus protection monitor will suspend execution of the process and search in a Registry table for an entry matching a code identifying the starting process. If the starting process is listed in the table, then the suspension of execution of the authorized process is removed without the system user ever knowing what happened. If the virus protection monitor does not find the matching identifier in the Registry table, then a dialogue box appears on the screen, warning the system operator that the application may be a virus. The system operator is given the options of cleaning, canceling the process or adding. If the operator elects to clean, then execution of the unauthorized process is prevented, the file that started this process is removed and an entry is placed in the virus log. If the operator elects to cancel, then execution of the suspicious process is prevented, the file that started this process is not removed and an entry is placed in the virus log. If the operator elects to add, then another dialogue box appears requesting confirmation. If the system operator confirms, then the process identifying code is encrypted and then added to the Registry table, and an entry is made to the virus log. If the system operator declines to confirm, then the confirmation dialogue box disappears, again exposing the alert dialogue box.

The Registry table is prestored on the hard disk and updated as new authorized application programs are installed. The virus protection monitoring software communicates with the Registry table via an encrypter/decrypter.

DETAILED DESCRIPTION OF THE PREFERRED EMBODIMENTS

Figure 1:
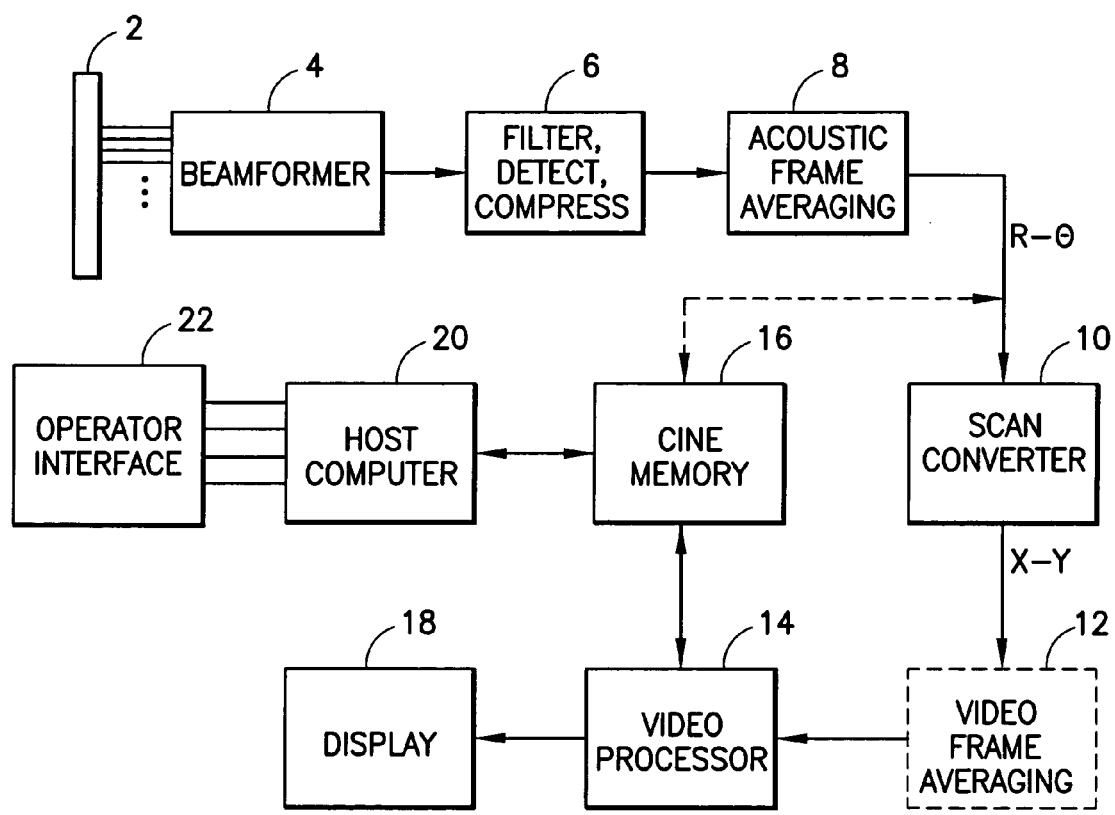
FIG. 1 is a block diagram showing a conventional ultrasound imaging system of the type which can be programmed with virus protection software.
Figure 2:
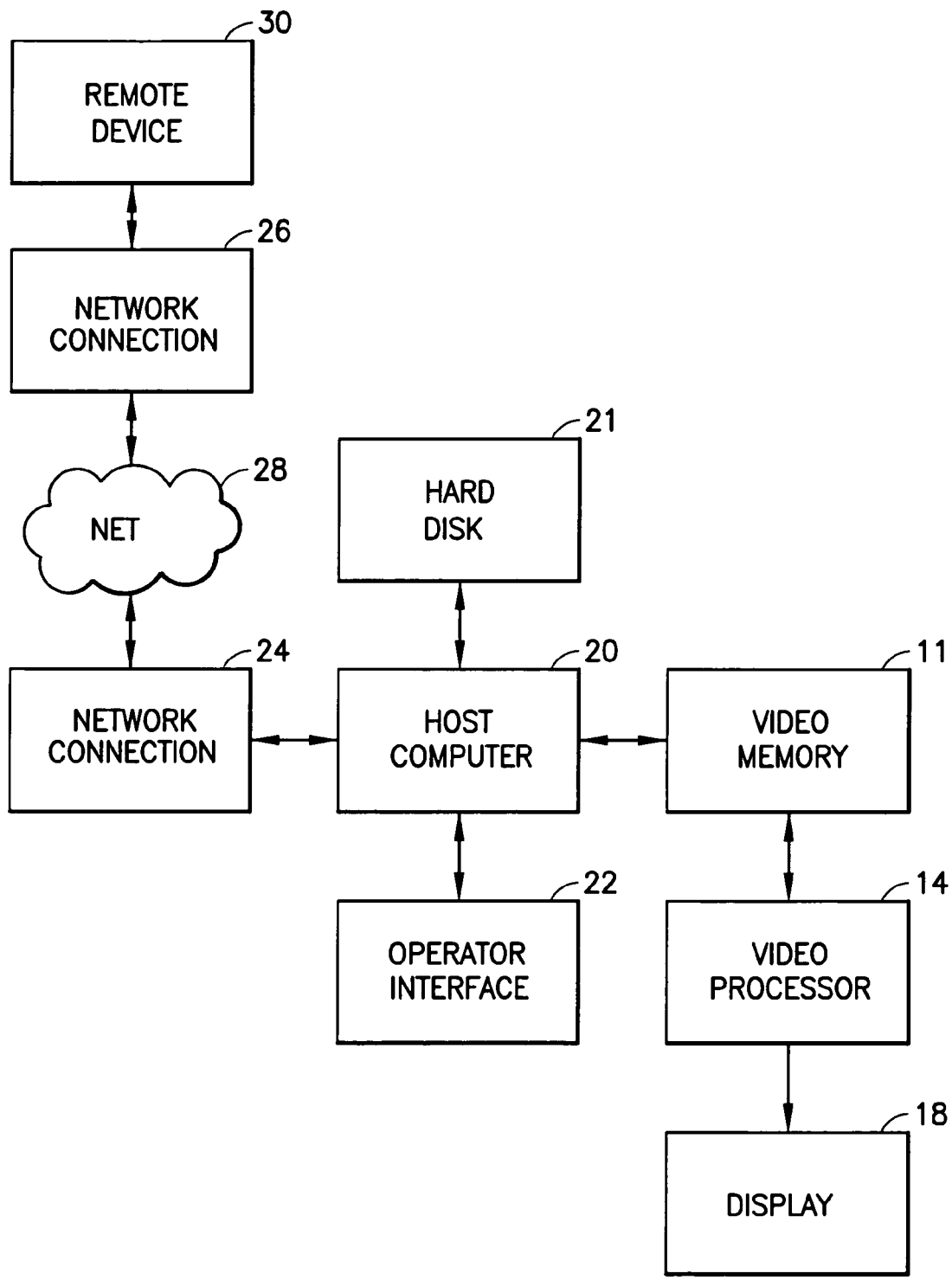
FIG. 2 is a block diagram showing an ultrasound imaging system having a network connection for communicating with remote devices.

FIG. 1 shows a conventional computerized ultrasound imaging system which can be programmed with software for detecting the presence of viruses in accordance with the preferred embodiments of the invention. The type of imaging system depicted in FIG. 1 has a B mode whereby the imager creates two-dimensional images of tissue and/or blood flow in which the intensity of each pixel is a function of the amplitude of the echo returned from a corresponding sample volume. The basic signal processing chain is as follows. An ultrasound transducer array 2 is activated by a transmitter in a beamformer 4 to transmit an acoustic burst which is focused at a point or zone along a scan line. The return RF signals are detected by the transducer elements and then dynamically focused to form a receive beam by a receiver in the beamformer 4. The receive beamformer output data (I/Q or RF) for each scan line is passed through a B-mode processing chain 6, which preferably includes demodulation, filtering, envelope detection, logarithmic compression and edge enhancement. Depending on the scan geometry, up to a few hundred receive vectors may be used to form a single acoustic image frame. To smooth the temporal transition from one acoustic frame to the next, some acoustic frame averaging 8 may be performed before scan conversion. In general, the log-compressed display data is converted by the scan converter 10 into X-Y format for video display. On some systems, frame averaging may be performed on the X-Y data (indicated by dashed block 12) rather than the acoustic frames before scan conversion, and sometimes duplicate video frames may be inserted between acoustic frames in order to achieve a given video display frame rate. The scan-converted frames are passed to a video processor 14, which maps the video data using a gray-scale mapping. The gray-scaled image frames are then sent to a video monitor 18 for display. System control is centered in a host computer 20, which accepts operator inputs through an operator interface 22 and in turn controls the various subsystems. (In FIG. 1, only the image data transfer paths are depicted.) The operator interface comprises a keyboard, a trackball, a multiplicity of pushbuttons, and other input devices such as sliding and rotary knobs. During imaging, a long sequence of the most recent images are stored and continuously updated automatically in a cine memory 16. Some systems are designed to save the R-θ acoustic images (this data path is indicated by the dashed line in FIG. 1), while other systems store the X-Y video images. The image loop stored in cine memory 16 can be reviewed via trackball control, and a section of the image loop can be selected for hard disk storage.

The host computer controls the various subsystems in accordance with operating instructions which are stored on a hard disk and then copied to system memory when the system is powered up. There are two basic ways in which files may become installed on the hard disk of the scanner. The first way is through physical media such as CD-ROM, MOD, etc. The second way is via a network.

In accordance with the preferred embodiments of the invention, the host computer of an ultrasound imaging system is programmed with virus protection features. For example, a hacker at a remote device 30 may attempt to send a file having a virus embedded therein to the ultrasound imager via a remote network connection 26, a network 28 and the imager network connection 24. The network 28 may comprise a local area network, a wide area network, a corporate intranet, the Internet, or any other network system, including a system of networks interconnected via gateways. The network connections typically each comprise a networking port and suitable networking software for formatting the data in accordance with the appropriate network protocol. In accordance with the preferred embodiment, before the infected file is installed on the hard disk 21, the host computer 20 will scan the infected file for the presence of viruses. If a possible virus is detected, the host computer sends an Alert dialogue box to the video memory 11 (part of the scan converter in FIG. 1) and a command to the video processor 14. In response to the command, the video processor 14 retrieves the dialogue box from the video memory and sends it to the display monitor 18 for display. As described in detail below, the dialogue box presents the system operator with optional responses to the virus alert. The system operator selects a response using the operator interface 22. The host computer 20 then takes appropriate action based on the system operator response.

Figure 3:
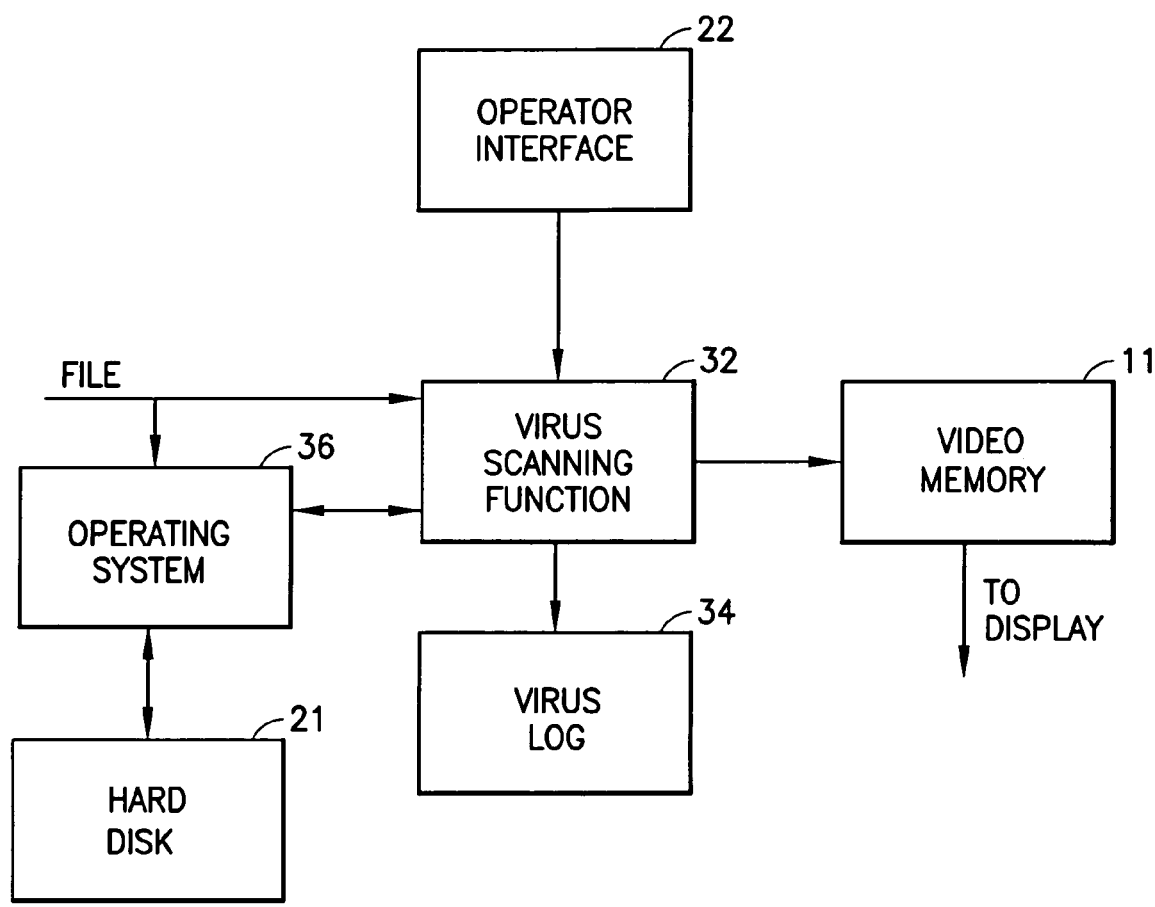
FIG. 3 is a block diagram showing a portion of an ultrasound imaging system having virus scanning software in accordance with the preferred embodiment of the invention.
Figure 5:
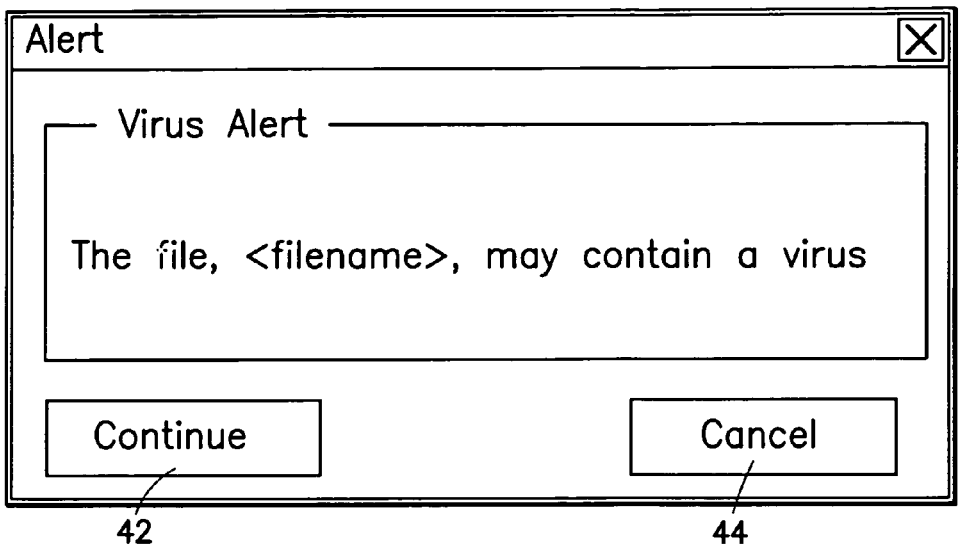
FIG. 5 is a schematic showing an Alert dialogue box which appears on the display monitor of the ultrasound imager when the virus scanning software in accordance with the preferred embodiment of the invention determines that a file being written to the hard disk may contain a virus.

In accordance with one feature of the preferred embodiment (which feature is shown in FIG. 3), each file that enters the system (via the hard disk or the networking port) is scanned by virus scanning software 32 to detect the presence of any virus in the file. Before each file is written to the hard disk 21 of the scanner by the operating system software 36, the Checksum and Size of the received file is verified, along with other virus-identifying attributes, to determine if the file is infected with a virus or if the file itself is a virus. The Checksum is a known error-detection scheme in which each transmitted file is accompanied by a numerical value based on the number of set bits in the file. The receiving station then applies the same formula to the file and checks to make sure the accompanying numerical value is the same. If not, the receiver can assume that the file has been garbled or infected with a virus. If there is a discrepancy in either the Checksum or Size, then the virus scanning function 32 sends an Alert dialogue box to the video memory 11 for display. The Alert dialogue box contains a warning that the received file may contain a virus. The content of this displayed Alert dialogue box is generally shown in FIG. 5. The system operator is given two options respectively represented by the virtual Continue button 42 and the virtual Cancel button 44. The system operator may elect to continue installing by clicking on Continue button 42 or may elect to cancel the installation by clicking on Cancel button 44. Clicking may be performed by any conventional means, including, for example, a mouse or a trackball coupled with a Set key.

Returning to FIG. 4, if the system operator clicks on the Continue button using the operator interface 22, the virus scanner 32 will instruct the operating system 36 to proceed with installation of the suspicious file on the hard disk 21.

Also the virus scanning function places an entry in a virus log 34, which is maintained on the scanner. The virus log is in ASCII format and is written to by the virus scanner 32. The virus log 34 contains only one type of entry. That entry is defined as follows:

If the system operator clicks on the Cancel button using the operator interface 22, the virus scanner 32 will instruct the operating system 36 to not install the suspicious file on the hard disk 21. In that case no entry to the virus log 34 is made.

Figure 4:
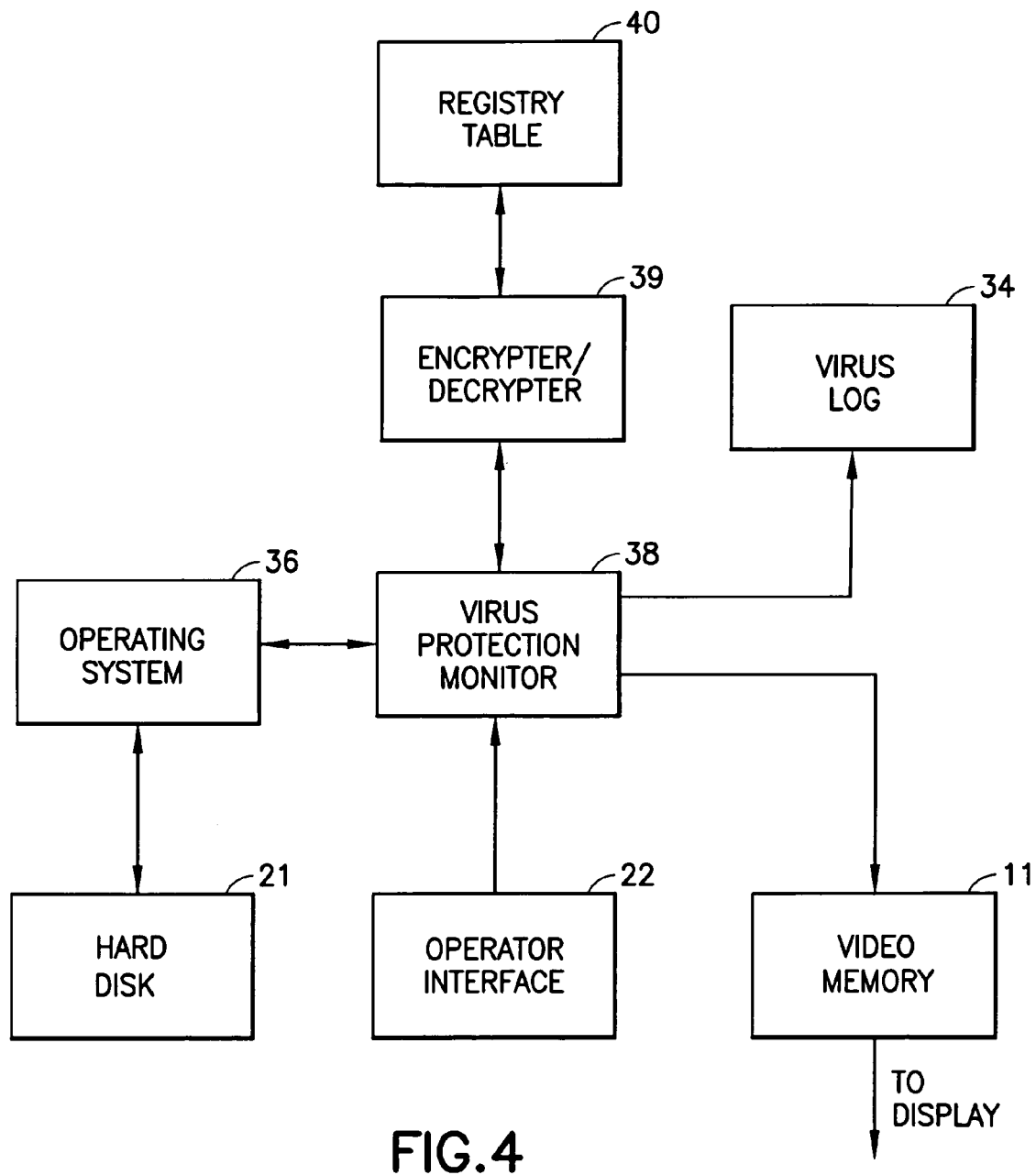
FIG. 4 is a block diagram showing a portion of an ultrasound imaging system having virus protection monitoring software in accordance with the preferred embodiment of the invention.

In accordance with another feature of the preferred embodiment (which feature is shown in FIG. 4), any process starting to run on the scanner is monitored. The monitoring operation will be performed whenever the scanner has received an instruction requiring it to execute an application program not yet copied from the hard disk to system memory. Each time a new process is started on the scanner, the operating system 36 will send notification to a virus protection monitor 38. The virus protection monitor 38 comprises software for monitoring each starting process. For each starting process, the operating system 36 will copy the appropriate application program from the hard drive 21 to the system memory, but will suspend execution of the program until instructed to resume by the virus protection monitor 38. The operating system sends the identifying code of the process being run to the virus protection monitor 38, which then searches in a Registry table 40 to determine whether the identified process is authorized.

In accordance with the preferred embodiment of the invention, the Registry table 40 is an encrypted file on the hard disk that contains a list of all processes that are approved by the system manufacturer or service provider to run on the scanner. Entries are made to this table manually by the field engineer or automatically by software applications written by the manufacturer or service provider and being installed on the system, i.e., the entry is written in the Registry table at the time when the software application is written to the hard disk. When a software application not written by the manufacturer or service provider is installed to the hard disk, no entry will be placed in the Registry table, thereby making such unauthorized software detectable at startup.

In accordance with one preferred embodiment of the invention, the virus protection monitor 38 reads the encrypted data from the Registry table. On the way to the virus protection monitor, the encrypted data read out of the Registry table 40 is decrypted by an encrypter/decrypter 39. The virus protection monitor 38 then searches the decrypted entries from the Registry table for an entry which matches the identifier received from the operating system for the starting process. If a match is found, this means that the starting process is authorized. The virus protection monitor 38 then instructs the operating system 36 to lift the suspension, i.e., to start executing this authorized process. These monitoring steps are transparent to the system operator, i.e., the suspension of process execution is removed without the system user ever knowing what happened.

Figure 6:
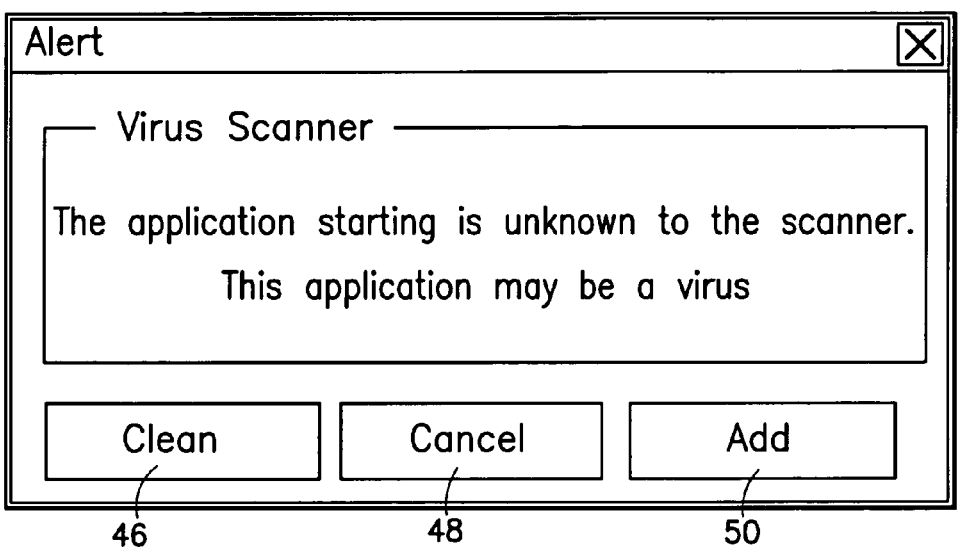
FIG. 6 is a schematic showing an Alert dialogue box which appears on the display monitor of the ultrasound imager when the virus protection monitoring software in accordance with the preferred embodiment of the invention determines that a file told to execute may contain or be a virus.

If the virus protection monitor 38 does not find an entry from the Registry table which matches the identifier received from the operating system for the starting process, then the virus protection monitor 38 sends an Alert dialogue box to the video memory 11 for display. The Alert dialogue box contains a warning that the starting application is unknown to the scanner and may be a virus. The content of this displayed Alert dialogue box is generally shown in FIG. 6. The system operator is given three options respectively represented by the virtual Clean button 46, the virtual Cancel button 48 and the virtual Add button 50. The system operator may elect to kill the process and remove the file that started the process by clicking on Clean button 46 or may elect to kill the process without removing the file by clicking on Cancel button 48 or may elect to register the starting process in the Registry table by clicking on Add button 50.

Figure 7:
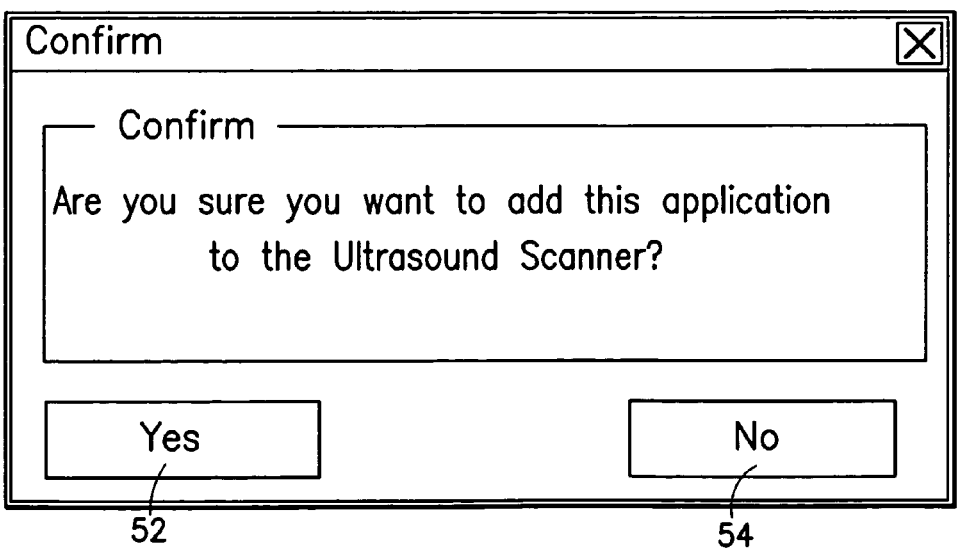
FIG. 7 is a schematic showing a Confirm dialogue box which appears on the display monitor of the ultrasound imager when the system operator is asked to confirm his/her instruction to add a suspicious process to a registry which lists approved processes.

Returning to FIG. 4, if the system operator clicks on the Clean button using the operator interface 22, the virus protection monitor 38 will instruct the operating system 36 to kill the suspicious process (i.e., prevent it from starting) and to remove the file that started the suspicious process from the hard disk 21. In addition, the virus protection monitor 38 places an entry in the virus log 34. If the system operator clicks on the Cancel button, the virus protection monitor 38 will instruct the operating system 36 to kill the suspicious process, and the user may continue as if nothing unusual had happened. The operating system 36 is not instructed to remove the file which started the suspicious process from the hard disk 21. Again, an entry is placed in the virus log 34 to record this event. If the operator clicks on the Add button, then a secondary Confirmation dialogue box (see FIG. 7) appears on the screen, overlying the primary dialogue box shown in FIG. 6. The Confirmation dialogue box asks the system operator to confirm that the suspicious process (application) should be registered in the Registry table 40. If the system operator selects the virtual Yes button 52, then the process will be registered in the Registry table to prevent the virus protection monitor 38 from flagging this process in the future, thereby treating this process as any other valid, registered process. An entry is made in the Virus log 34. If the user selects the virtual No button 54, then the Confirmation dialogue box disappears and the system operator is taken back to the Alert dialogue box shown in FIG. 6.

To register the process, the identifying code previously received from the operating system 36 will be sent to the encrypter/decrypter 39 for encryption. The encrypted identifier is then written into the Registry table 40.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The invention claimed is:

1. An ultrasound imaging system comprising:
an image acquisition subsystem for acquiring frames of image data;
system memory storing said acquired frames of image data and operating instructions;
a display subsystem for displaying images derived from said acquired frames of image data;
a display processor for controlling said display subsystem to display frames of image data;
a hard disk storing frames of image data, said operating instructions and a registry file containing encrypted data representing a list of all processes that are approved by the system manufacturer or service provider to run on the imaging system;

an operating system that copies said operating instructions from said hard disk to said system memory when the imaging system is powered up; and a host computer programmed to control said image acquisition subsystem and said display subsystem in accordance with operating instructions transferred from said hard disk to said system memory, and further programmed with first and second computer virus protection features, said first computer virus protection feature comprising means for detecting a file having an attribute of a computer virus before said file is installed on said hard disk, and said second computer virus protection feature comprising means for monitoring an application program to be executed by said operating system but not yet copied from said hard disk to said system memory, said monitoring means comprising means for decrypting said encrypted data in said registry file and means for searching said decrypted data for an entry matching the identifier received from said operating system identifying a starting process of said application program to be executed by said operating system.

2. The ultrasound imaging system as recited in claim 1, wherein said attribute is a checksum of said file.

3. The ultrasound imaging system as recited in claim 1, wherein said attribute is a size of said file.

4. The ultrasound imaging system as recited in claim 1, wherein said host computer is further programmed with:

means for actuating display of a graphical user interface by said display subsystem in response to detection of said file having an attribute of a computer virus, said graphical user interface comprising a virus alert and a virtual actuator; and means for instructing said operating system to install said file in response to selection of said virtual actuator.

5. The ultrasound imaging system as recited in claim 4, further comprising a log of virus detection events, wherein said host computer is further programmed with means for logging an entry in said log in response to selection of said virtual actuator.

6. The ultrasound imaging system as recited in claim 1, wherein said host computer is further programmed with means for actuating display of a first graphical user interface by said display subsystem in response to detection that said starting process is not registered, said first graphical user interface comprising a virus alert and a virtual actuator.

7. The ultrasound imaging system as recited in claim 6, wherein said host computer is further programmed with means for instructing said operating system to kill said starting process in response to selection of said virtual actuator on said first graphical user interface.

8. The ultrasound imaging system as recited in claim 7, further comprising a log of virus detection events, wherein said host computer is further programmed with means for logging an entry in said log in response to selection of said virtual actuator on said first graphical user interface.

9. The ultrasound imaging system as recited in claim 7, wherein said host computer is further programmed with means for instructing said operating system to remove said application program from said hard disk in response to selection of said virtual actuator on said first graphical user interface.

10. The ultrasound imaging system as recited in claim 6, wherein said host computer is further programmed with:

means for actuating display of a second graphical user interface by said display subsystem in response to selection of said virtual actuator on said first graphical user interface, said second graphical user interface comprising a request for confirmation and a virtual actuator; and means for adding information to said registry file for registering said application program in response to selection of said virtual actuator on said second graphical user interface.

11. The ultrasound imaging system as recited in claim 10, further comprising an encrypter arranged to encrypt information sent from said host computer to said registry file on said hard disk.

12. An ultrasound imaging system comprising:

an image acquisition subsystem for acquiring frames of image data;

system memory storing said acquired frames of image data and operating instructions;

a display subsystem for displaying images derived from said acquired frames of image data;

a display processor for controlling said display subsystem to display frames of image data;

a hard disk storing frames of image data, said operating instructions and a registry file containing encrypted data representing a list of all processes that are approved by the system manufacturer or service provider to run on the imaging system;

an operating system that copies said operating instructions from said hard disk to said system memory when the imaging system is powered up; and a host computer programmed to control said image acquisition subsystem and said display subsystem in accordance with operating instructions transferred from said hard disk to said system memory, and further programmed with means for monitoring an application program to be executed by said operating system but not yet copied from said hard disk to said system memory, said monitoring means comprising means for decrypting said encrypted data in said registry file and means for searching said decrypted data for an entry matching the identifier received from said operating system identifying a starting process of said application program to be executed by said operating system.

13. The ultrasound imaging system as recited in claim 12, wherein said host computer is further programmed with means for actuating display of a first graphical user interface by said display subsystem in response to detection that said starting process is not registered, said first graphical user interface comprising a virus alert and a virtual actuator.

14. The ultrasound imaging system as recited in claim 13, wherein said host computer is further programmed with means for instructing said operating system to kill said starting process in response to selection of said virtual actuator on said first graphical user interface.

15. The ultrasound imaging system as recited in claim 14, further comprising a log of virus detection events, wherein said host computer is further programmed with means for logging an entry in said log in response to selection of said virtual actuator on said first graphical user interface.

16. The ultrasound imaging system as recited in claim 14, wherein said host computer is further programmed with means for instructing said operating system to remove said application program from said hard disk in response to selection of said virtual actuator on said first graphical user interface.

17. The ultrasound imaging system as recited in claim 13, wherein said host computer is further programmed with:

means for actuating display of a second graphical user interface by said display subsystem in response to selection of said virtual actuator on said first graphical user interface, said second graphical user interface comprising a request for confirmation and a virtual actuator; and means for adding information to said registry file for registering said application program in response to selection of said virtual actuator on said second graphical user interface.

18. The ultrasound imaging system as recited in claim 17, further comprising an encrypter arranged to encrypt information sent from said host computer to said registry file on said hard disk.

\* \* \* \* \*